(12) United States Patent
Park

(10) Patent No.: US 6,892,538 B2
(45) Date of Patent: May 17, 2005

(54) APPARATUS FOR CONTROLLING EXHAUST ATTACK ANGLE FOR A VARIABLE TURBINE

(75) Inventor: Jun-Cheol Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/293,921

(22) Filed: Nov. 13, 2002

(65) Prior Publication Data

US 2003/0089109 A1 May 15, 2003

(30) Foreign Application Priority Data

Nov. 13, 2001 (KR) .......................................... 2001-70428

(51) Int. Cl.⁷ .......................... F02D 23/00; F01B 29/10
(52) U.S. Cl. .............................. 60/602; 60/527; 60/528
(58) Field of Search ........................ 60/602, 527, 528, 60/529; 415/150, 160, 164; 92/169.2; 72/429

(56) References Cited

U.S. PATENT DOCUMENTS

| | | | | |
|---|---|---|---|---|
| 4,490,622 A | * | 12/1984 | Osborn | 60/602 |
| 4,490,975 A | * | 1/1985 | Yaeger et al. | 60/527 |
| 4,559,512 A | * | 12/1985 | Yaeger et al. | 60/527 |
| 4,657,476 A | * | 4/1987 | Berg | 415/164 |
| 4,779,423 A | * | 10/1988 | Szczupak | 60/602 |
| 4,811,564 A | * | 3/1989 | Palmer | 60/527 |
| 5,146,752 A | * | 9/1992 | Bruestle | 60/602 |
| 5,205,147 A | * | 4/1993 | Wada et al. | 72/429 |
| 5,211,371 A | * | 5/1993 | Coffee | 60/527 |
| 5,996,347 A | * | 12/1999 | Nagae et al. | 60/602 |
| 6,260,358 B1 | * | 7/2001 | Daudel et al. | 60/602 |
| 6,415,706 B1 | * | 7/2002 | Poschl et al. | 92/169.2 |
| 6,546,728 B2 | * | 4/2003 | Schmidt et al. | 60/602 |
| 6,582,190 B2 | * | 6/2003 | Jinnai | 60/602 |
| 2003/0185672 A1 | * | 10/2003 | Suganami et al. | 415/150 |

FOREIGN PATENT DOCUMENTS

| | | | | |
|---|---|---|---|---|
| DE | 198 58 293 C1 | 12/1998 | | F02B/37/00 |
| JP | 59-193396 | 9/1984 | | 415/161 |
| JP | 60195386 A | * 10/1985 | | F03G/7/06 |
| JP | 62157280 A | * 7/1987 | | F03G/7/06 |
| JP | 63-31224 | 2/1988 | | |

* cited by examiner

Primary Examiner—Thai-Ba Trieu
(74) Attorney, Agent, or Firm—Morgan Lewis & Bockius LLP

(57) ABSTRACT

An apparatus for controlling an exhaust attack angle for a variable turbine applied in a turbocharger of an engine is provided that comprises: an actuator driven according to a strength of a supplied current; one or more vanes rotatably installed at the perimeter of a turbine; and a transmission assembly that is linked to said actuator, which converts linear motion of the actuator to rotational motion and transmits the rotational motion to the vane in order to rotate the vane, thereby varying the exhaust attack angle based on the strength of the supplied current.

19 Claims, 4 Drawing Sheets

APPARATUS FOR CONTROLLING EXHAUST ATTACK ANGLE FOR A VARIABLE TURBINE

FIELD OF THE INVENTION

The present invention relates to an apparatus for controlling the exhaust attack angle of a variable turbine, and more particularly, to an apparatus for controlling the exhaust attack angle of a turbine blade of a variable turbine that is installed in the exhaust side of a turbocharger.

BACKGROUND OF THE INVENTION

Generally, a diesel engine uses a turbocharger system to increase the pressure of the air drawn by the engine. The turbocharger is operated by exhaust gas in order to pressurize, or boost, intake air. In a conventional turbocharger system, the rotating speed of the turbine is determined by the amount of exhaust gas from the exhaust manifold. When an engine is rotating slowly it produces less exhaust and, thus, the intake air cannot be compressed because the exhaust pressure is low. The turbine also resists rotating faster through friction and inertia. Consequently, at times, the torque developed by the engine may not be satisfactory due to low boost pressure.

SUMMARY OF THE INVENTION

In a preferred embodiment of the present invention, an apparatus controls the attack angle of the exhaust or the turbine to use the discharge speed of the exhaust more efficiently. The apparatus for controlling the exhaust attack angle of a variable turbine applied in a turbocharger of an engine comprises an actuator, one or more vanes, and a transmission assembly. The actuator is driven according to a strength of a supplied current. The vanes are rotatably installed at the perimeter of a turbine and the transmission assembly is linked to said actuator. The transmission assembly converts linear motion of the actuator to rotational motion and transmits the rotational motion to the vane in order to rotate the vane.

In a further preferred embodiment, the actuator comprises a current amplifier, an expansion and contraction part, and an operating rod. The current amplifier outputs a current signal after amplifying an input current signal to a specific magnitude. The expansion and contraction part preferably comprises a shape-memory alloy and its ends are connected to a positive terminal and a negative terminal of the current amplifier, which provides the expansion and contraction part with a current. The operating rod is connected to an end of the expansion and contraction part in order to be linked with expansion and contraction motion of the expansion and contraction part. Preferably, the expansion and contraction part has the form of a spring. It is also preferable that ends of the expansion and contraction part are respectively provided with a positive terminal plate and a negative terminal plate, and that these terminal plates are connected to corresponding terminals of the current amplifier.

In another preferred embodiment, the actuator further comprises a tube case with a through-hole into which the expansion and contraction part is inserted. Preferably, the operating rod and the tube case are composed of a ceramic material.

In a further preferred embodiment, the actuator is installed on an equipped bracket which is connected to a turbine case.

In an additional preferred embodiment of the present invention, the transmission assembly comprises an outer crank, a rotating plate, an inner crank, a rotating ring, and one or more rotary cams. The outer crank is connected to the actuator to be linked with the actuator to be operated. One end of the rotating plate is connected to the outer crank. The inner crank is connected to the other end of the rotating plate in order to rotate. The rotating ring is installed inside the turbine case in order to be rotatable in conjunction with rotation of a driving cam formed at one end of the inner crank. The rotary cams are respectively installed in one or more grooves formed along the inner circumference of the rotating ring, to be linked with rotation of the rotating ring, of which one end is connected to the vane by way of a rotary shaft.

BRIEF DESCRIPTION OF THE DRAWINGS

A preferred embodiment of the present invention will hereinafter be described in detail with reference to the accompanying drawings in which.

Like numerals refer to similar elements throughout the several drawings.

DETAILED DESCRIPTION OF THE PREFERRED EMBODIMENTS

Figure 4:
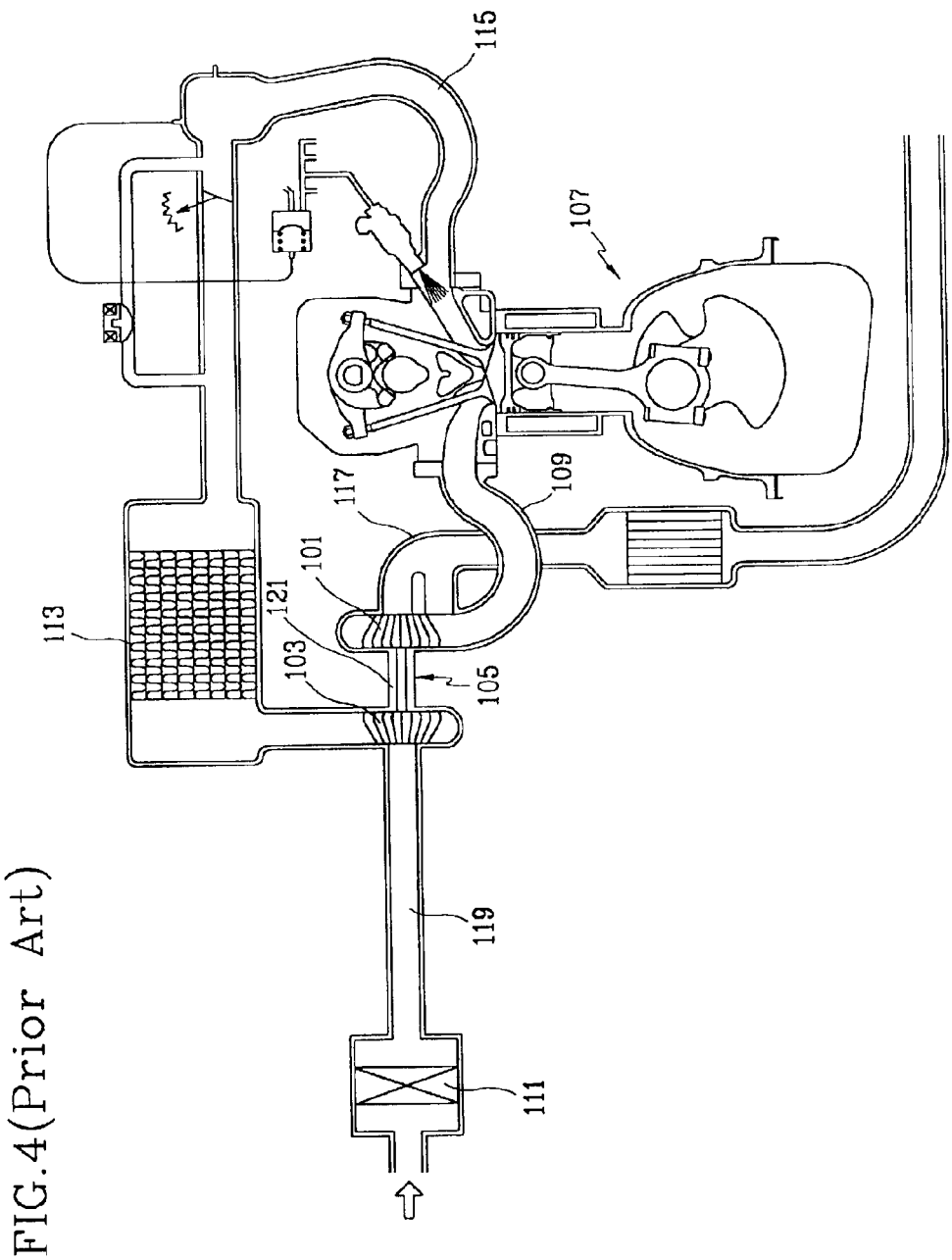
FIG. 4 is a schematic view of a general turbocharger system.

In a turbocharger system, as shown generally in FIG. 4, a turbine 101 of a turbocharger 105 is connected to an exhaust manifold 109 and supplied with exhaust gas from an engine 107. A blower 103 is connected to an intake system to supply the engine 107 with intake air, by pushing intake air through an intercooler 113 and an intake manifold 115 after drawing the intake air from an air cleaner 111 through an intake duct 119. The turbine 101 is connected to the blower 103 through a rotary shaft 121, and the rotary shaft 121 is supported by journal bearings (not shown). The pressure of the exhaust gas causes the turbine 101 to rotate. An exhaust duct 117 receives the discharge exhaust gas from the turbine 101. The blower 103, which is connected to the turbine through the rotary shaft 121, rotates and compresses the intake air from the air cleaner 111, sending it into the intake manifold 115 after passing it through the intercooler 113.

Figure 1:
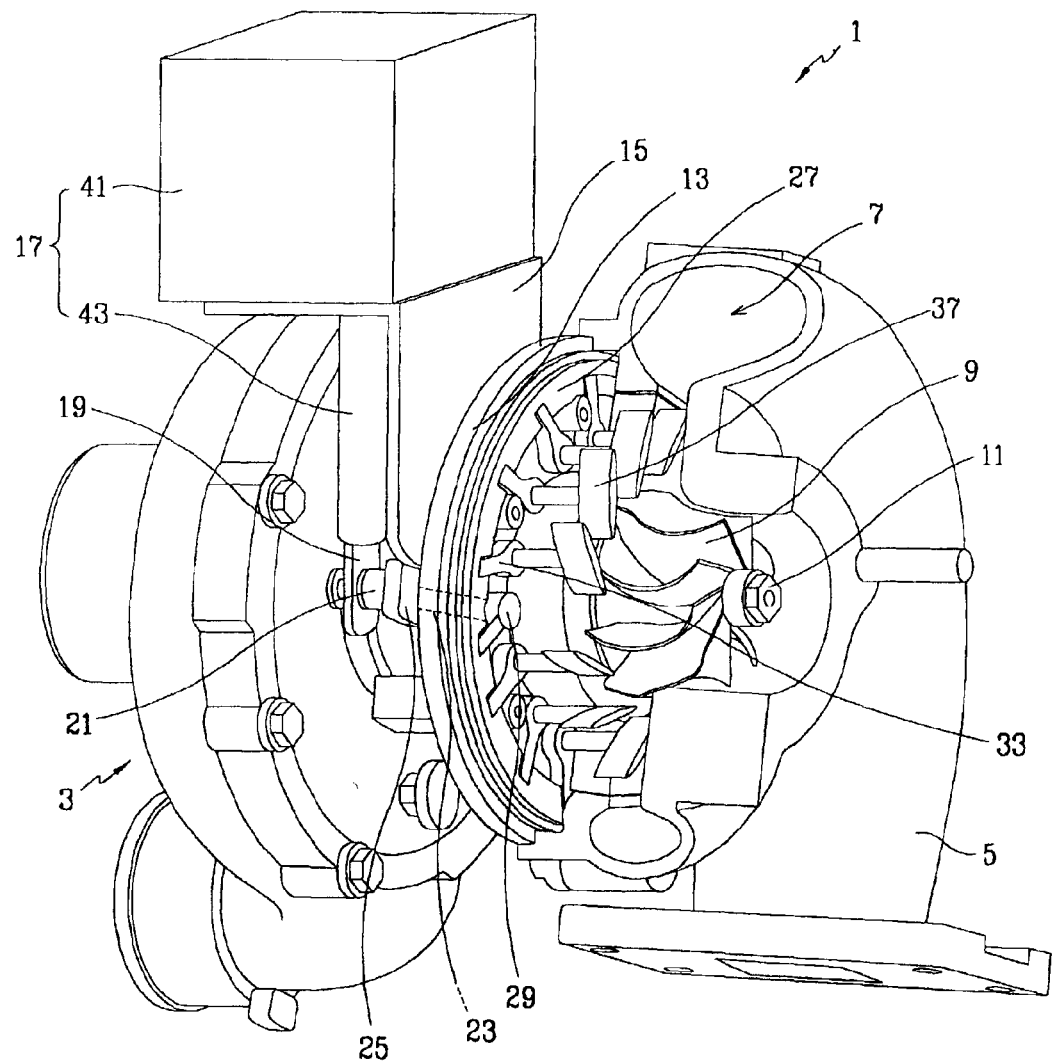
FIG. 1 is a partial sectional perspective view of a variable turbine of the present invention.

In FIG. 1, a variable turbine 1 of the present invention includes a turbine case 7 that comprises an exhaust gas supply pipe 5, which supplies exhaust gas from an exhaust manifold of an engine (not shown). The variable turbine also includes a turbine blade 9 connected to a blower 3 by way of a rotary shaft 11, and a cover 13 that covers the turbine.

Figure 2:
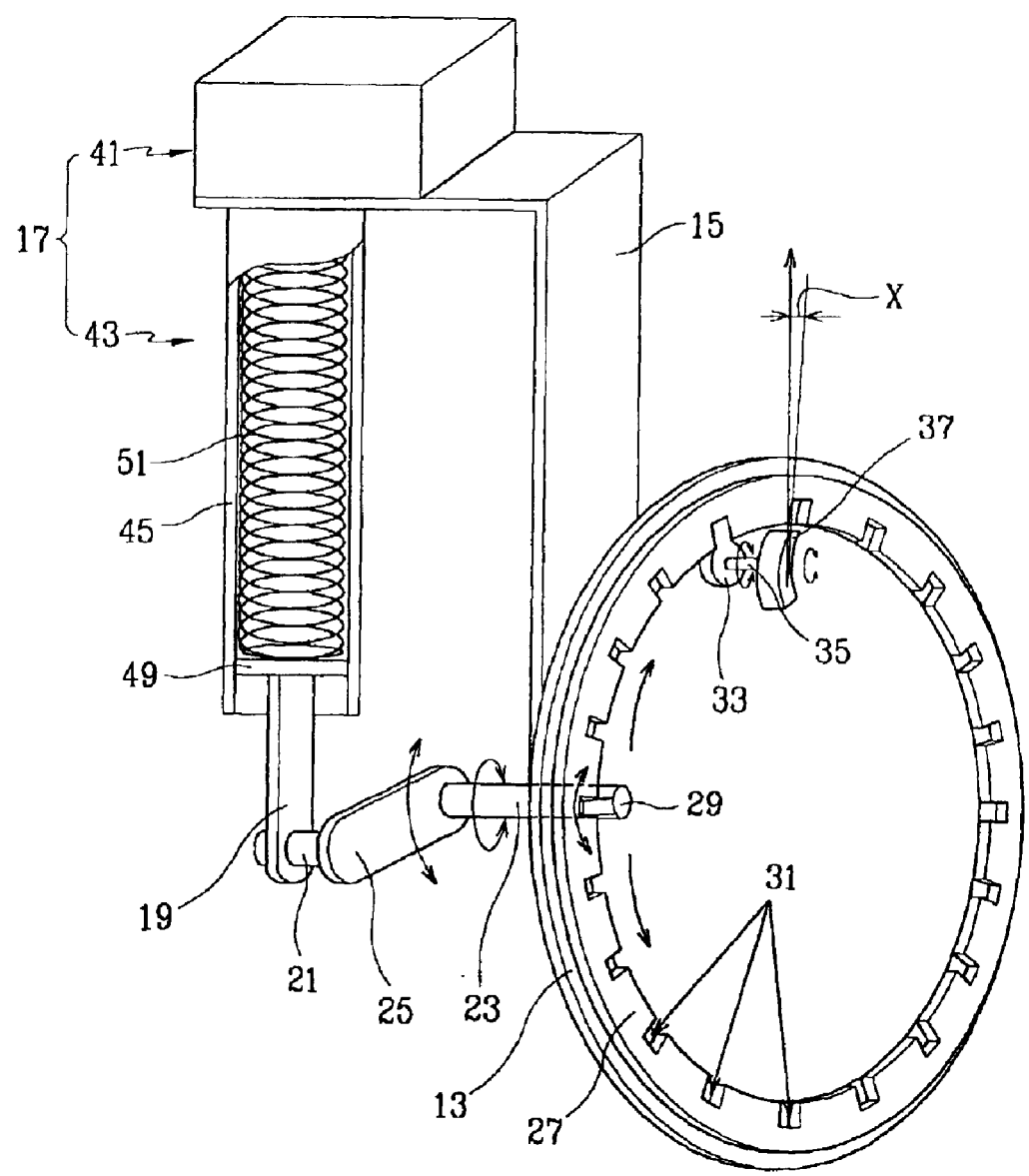
FIG. 2 is a schematic view of an apparatus for controlling an exhaust attack angle for a variable turbine according to the present invention.

In FIG. 2, an actuator 17 connects through bracket 15 to one side of the outside of the cover 13. A front stage of an operating rod 19 of the actuator 17 is connected to one end of a rotating plate 25 by an outer crank 21, and the other end of the rotating plate 25 is connected to one end of an inner crank 23 that is rotatably installed in one side of the cover 13. A rotating ring 27, which is rotatable with respect to the cover 13, engages one side of a driving cam 29 that is provided at the other end of the inner crank 23. Driving cam 29 rotates with inner crank 23, causing rotating ring 27 to rotate as well.

Rotating ring 27 also contains a plurality of cam grooves 31 that are formed at regular intervals along the inner circumference of the ring. A plurality of rotary cams 33 are respectively provided in grooves 31, with the ends of a plurality of rotary shafts 35 connected to each rotary cam 33. The other end of each rotary shaft 35 is connected to a vane 37, each of which is arranged at a regular interval at the perimeter of the turbine 9.

Figure 3:
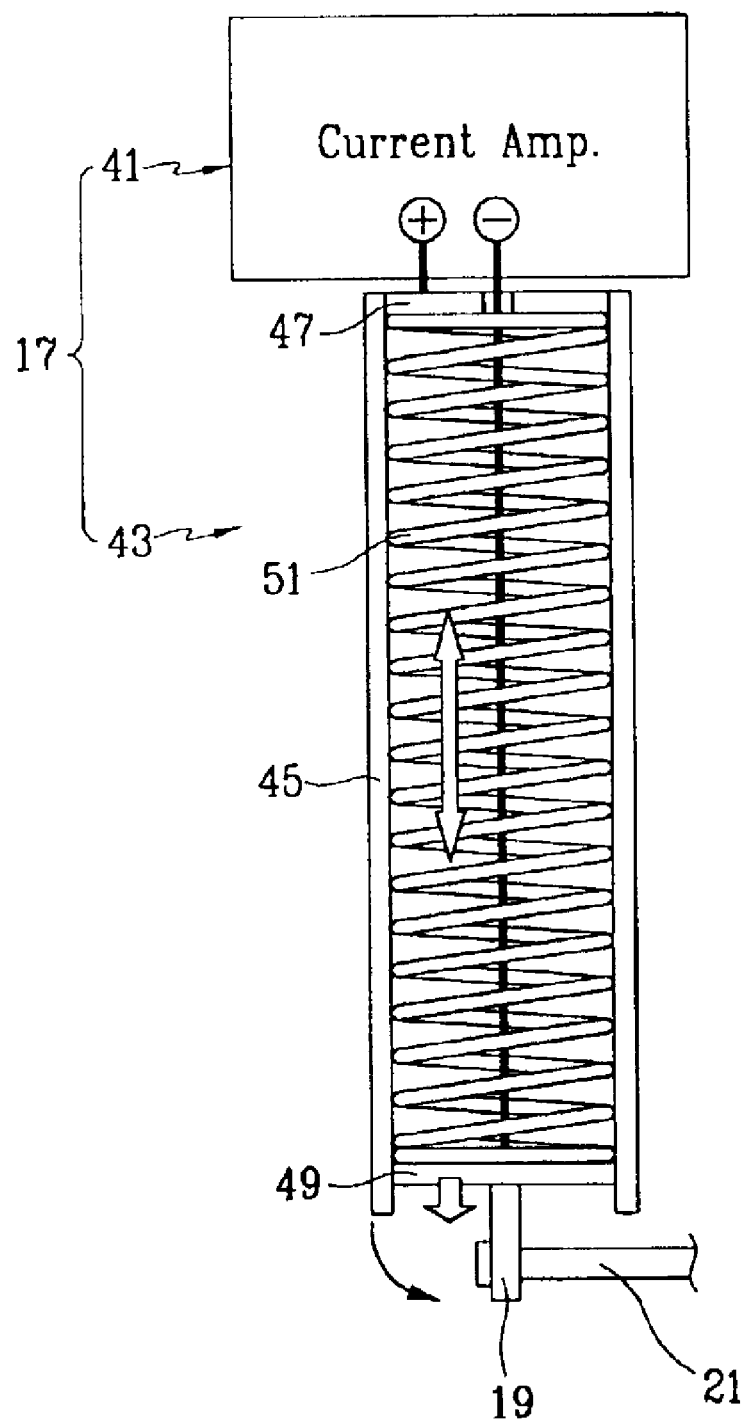
FIG. 3 is a detailed schematic view of an actuator applied in an apparatus for controlling the exhaust attack angle for a variable turbine according to the present invention.

As shown in FIG. 3, the actuator 17 is constructed with a current amplifier 41 at the top end of the equipped bracket 15. Amplifier 41 amplifies an electric signal input from an engine control unit (not shown) and outputs a current signal. A driving part 43, provided at the bottom of the current amplifier, moves the operating rod 19 up and down according to the current signal output by the current amplifier 41. The driving part 43 of the actuator 17 includes a tube case 45 that is installed below the current amplifier 41 and a positive terminal plate 47, which is connected to the positive terminal of the current amplifier 41. The tube case 45 is fixed in place with respect to amplifier 41 and is preferably formed of a ceramic material. A negative terminal plate 49 is installed below the tube case 45 to be movable along the inside thereof, and it is connected to the negative terminal of the current amplifier 41. The operating rod 19 is then connected to the bottom of the negative terminal plate 49. A spring 51, composed of a shape-memory alloy, is located between the positive terminal plate 47 and the negative terminal plate 49 inside the tube case 45, and it is respectively connected to the terminal plates 47 and 49. The spring 51 contracts or expands according to the current supplied to the spring 51. The shape-memory alloy is an alloy of which the shape returns to an original shape when it is heated over a specific transition temperature. Examples of such include a nickel-titanium alloy, a copper-zinc-aluminum alloy, and so forth. When a varying current is supplied to the spring produced from the shape-memory alloy, the spring 51 is heated according to the variation of the current and the spring 51 may contract or expand. In the apparatus for controlling the exhaust attack angle according to the present embodiment, the shape-memory alloy is formed in the shape of a spring, but one of ordinary skill in the art will recognize that the shape-memory alloy may take other shapes.

The apparatus functions in the following manner. When the engine is running at a high speed, or revolutions per minute (rpm), the current amplifier 41 receives an electric signal corresponding to the high rpm, from the engine control unit (not shown). Current amplifier 41 outputs a current signal to the spring 51 that is proportional to the input current, heating spring 51 with the current conducted therethrough. The spring 51 then contracts in length and pulls one side of the rotating plate 25 by way of the outer crank 21. This causes the inner crank 23, that is connected to the other side of the rotating plate 25, to rotate the rotating ring 27 in a high rpm direction by way of the driving cam 29. By rotating the rotating ring 27, each vane 37 is rotated by its corresponding rotary cam 33 and rotary shaft 35. This changes the exhaust attack angle (X) such that the incidence angle of exhaust gas supplied to the turbine blade 9 is lessened, thereby supplying less exhaust gas pressure to the turbine vanes.

Conversely, when the engine is running at a low rpm, the current amplifier 41 receives an electric signal, corresponding to the low rpm, from the engine control unit (not shown). Current amplifier 41 outputs a corresponding decreased current signal to the spring 51. The spring 51 then cools and expands in length, pushing one side of the rotating plate 25 by way of the outer crank 21. This causes the inner crank 23 that is connected to the other side of the rotating plate 25, to rotate the rotating ring 27 in a low rpm direction by way of the driving cam 29. By rotating the rotating ring 27, each vane 37 is rotated by its corresponding rotary cam 33 and rotary shaft 35. This changes the exhaust attack angle (X) such that the incidence angle of exhaust gas supplied to the turbine 9 is increased, thereby supplying more exhaust gas pressure to the turbine vanes.

Although the incidence angle of the exhaust gas is not shown here, the changes in the exhaust attack angle (X) cause the exhaust gas to be glancingly incident upon the turbine at a high rpm, and directly incident upon the turbine at a low rpm. Consequently controlling the power of the turbine.

As described above, with the apparatus for controlling the exhaust attack angle for a variable turbine according to the present invention, the angle of the vanes installed in the variable turbine can be precisely and automatically controlled so that the efficiency of the engine power can be maximized. While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for varying the attack angle on a turbine, the apparatus comprising:
    an actuator driven according to engine speed, said actuator comprising:
        an amplifier for creating an output current signal from an input engine speed signal, wherein the output current signal is proportional to the input signal;
        an actuator part that moves in response to the output current signal; and
    a transmission assembly, said transmission assembly comprising:
        a driving cam, movement of said actuator part causing said driving cam to rotate;
        a rotating ring installed along a perimeter of the turbine, rotation of said driving cam causing said rotating ring to rotate; and
        one or more vanes on mounts along a perimeter of the turbine, wherein said mounts are rotatable to vary the attack angle of the one or more vanes on the turbine, and wherein rotation of said rotating ring causes said mounts to rotate.

2. The apparatus of claim 1, wherein the actuator part moves in response to heat generated by the output current signal.

3. An apparatus for varying the attack angle on a turbine, the apparatus comprising:
    an actuator driven according to engine speed;
    one or more vanes installed along a perimeter of the turbine, said vanes being rotatable to vary the attack angle on the turbine; and
    a transmission assembly driven by the actuator and operatively engaged with said vanes, whereby the transmission assembly causes the one or more vanes to rotate, wherein said actuator comprises:
        an amplifier, wherein said amplifier amplifies an input engine speed signal into an output current signal; and
        an expansion and contraction part, wherein said expansion and contraction part expands or contracts in response to said output current signal, wherein the output current signal is proportional to the input signal.

4. The apparatus of claim 3, wherein said expansion and contraction part rotates due to said expansion and contraction.

5. The apparatus of claim 3, wherein said transmission assembly comprises:
   a driving cam, said expansion or contraction causing said driving cam to rotate;
   a rotating ring installed along a perimeter of the turbine, rotation of said driving cam causing said rotating ring to rotate and rotation of said rotating ring causing said vanes to rotate.

6. An apparatus for controlling an exhaust attack angle for a variable turbine in a turbocharger of an engine, the apparatus comprising:
   an actuator driven by a supplied signal;
   one or more vanes rotatably installed at the perimeter of the turbine; and
   a transmission assembly, linked to said actuator, that converts linear motion of said actuator to rotational motion and transmits the rotational motion to said vane to rotate said vane, wherein said actuator comprises:
      a current amplifier for outputting a current signal after amplifying an input current signal;
      an expansion and contraction part that expands and contracts in response to the output current signal; and
      an operating rod, installed at an end of said expansion and contraction part, that moves in response to the motion of said expansion and contraction part, wherein the output current signal is proportional to the input signal.

7. The apparatus of claim 6, wherein said expansion and contraction part is formed as a spring.

8. The apparatus of claim 7, wherein said actuator further comprises a tube case with a through hole into which said expansion and contraction part is inserted.

9. The apparatus of claim 8, wherein said operating rod and said tube case are respectively composed of a ceramic material.

10. The apparatus of claim 7, wherein ends of said expansion and contraction part are respectively provided with a positive terminal plate and a negative terminal plate, said terminal plates being connected to corresponding terminals of said current amplifier, and said operating rod is connected to one of said terminal plates.

11. The apparatus of claim 6, wherein said actuator is installed on an equipped bracket that is connected to a turbine case.

12. The apparatus of claim 6, wherein the variable turbine includes a turbine case and said transmission assembly comprises:
   an outer crank connected to said actuator in order to be linked and moved by motion of said actuator;
   a rotating plate, one end of which is connected to said outer crank and that rotates in response to motion of said outer crank;
   an inner crank connected to the other end of said rotating plate and rotating with said rotating plate;
   a rotating ring installed inside said turbine case and rotatable by a driving cam formed at one end of said inner crank; and
   one or more rotary cams that are connected to said vane by way of a rotary shaft, and engaged in one or more grooves formed along an inner circumference of said rotating ring, and rotated by rotation of said rotating ring.

13. The apparatus of claim 6, wherein said expansion and contraction part is composed of a shape memory alloy.

14. The apparatus of claim 6, wherein said current signal is based on engine revolutions per minute.

15. The apparatus of claim 6, wherein the current signal controls expansion and contraction of the expansion and contraction part by controllably heating the expansion and contraction part.

16. The apparatus of claim 15, wherein heating the expansion and contraction part with the current signal contracts the expansion and contraction part to retract the operating rod and rotate the at least one rotatable vane to reduce the exhaust attack angle of the turbine.

17. An apparatus for controlling an exhaust attack angle for a variable turbine in a turbocharger of an engine, the apparatus comprising:
   an actuator driven by a supplied signal;
   one or more vanes rotatably installed at the perimeter of the turbine; and
   a transmission assembly, linked to said actuator, that converts linear motion of said actuator to rotational motion and transmits the rotational motion to said vane to rotate said vane, wherein said actuator comprises:
      a current amplifier for outputting a current signal after amplifying an input current signal,
      an expansion and contraction part that expands and contracts in response to the output current signal; and
   an operating rod, installed at an end of said expansion and contraction part, that moves in response to the motion of said expansion and contraction part, said expansion and contraction part being formed as a spring, and ends of said expansion and contraction part are respectively provided with a positive terminal plate and a negative terminal plate, said terminal plates being connected to corresponding terminals of said current amplifier, and the expansion and contraction part being made of a shape memory alloy.

18. The apparatus of claim 17, wherein said supplied signal is based on engine revolutions per minute.

19. The apparatus of claim 17 wherein the supplied signal is a current signal.

* * * * *